(12) United States Patent
Vipperman

(10) Patent No.: US 9,399,313 B1
(45) Date of Patent: Jul. 26, 2016

(54) METHOD OF MANUFACTURING AND COMPOSITION OF RUBBER WHEELS TO REMOVE ADHESIVE

(71) Applicant: Howard Vipperman, La Habra, CA (US)

(72) Inventor: Howard Vipperman, Brea, CA (US)

(73) Assignee: Astro Pneuematic Tool Company, South El Monte, CA (US)

( * ) Notice: Subject to any disclaimer, the term of this patent is extended or adjusted under 35 U.S.C. 154(b) by 202 days.

(21) Appl. No.: 14/099,422

(22) Filed: Dec. 6, 2013

(51) Int. Cl.
*B29C 35/02* (2006.01)
*C08K 13/02* (2006.01)

(52) U.S. Cl.
CPC ................ *B29C 35/02* (2013.01); *C08K 13/02* (2013.01)

(58) Field of Classification Search
CPC ............ B29C 2045/1721; B24B 23/02; B24B 127/033; B24B 29/00; Y10T 29/49544; Y10T 29/4956; Y10T 29/49565
USPC ......... 524/425, 426, 432, 444; 492/53, 56, 59
See application file for complete search history.

(56) References Cited

U.S. PATENT DOCUMENTS

| | | |
|---|---|---|
| 5,624,990 A | 4/1997 | Vipperman |
| 5,856,396 A * | 1/1999 | Vipperman ............ B24B 23/02 524/425 |
| 6,759,456 B2 | 7/2004 | Kikuchi |
| 7,275,572 B2 | 10/2007 | Kikuchi |
| 7,351,761 B2 | 4/2008 | Hochi |
| 8,007,347 B1 | 8/2011 | Lampka et al. |
| 8,034,859 B2 | 10/2011 | Flannigan et al. |
| 8,286,291 B2 | 10/2012 | Lampka et al. |
| 8,304,480 B2 | 11/2012 | Uchida et al. |
| 2012/0048298 A1 * | 3/2012 | Humphrey ................ B08B 1/00 134/6 |

* cited by examiner

*Primary Examiner* — Christopher Besler
(74) *Attorney, Agent, or Firm* — Adduci, Mastriani & Schaumberg LLP

(57) ABSTRACT

The present invention is an improved method of manufacturing rubber wheels and composition thereof used on a portable vehicle adhesive remover for removing pinstripes, decals, side moldings and other items adhering to a vehicle without damaging the original paint of the vehicle. The improved method of manufacturing rubber wheels may comprise masticating approximately 100 parts of rubber in a mixer and synthesizing a rubber compound by mixing in at least 8 parts of activating agents, less than 60 parts of processing oil, between 0.1% and 1.5% by parts of cross-linking agent, and at least 1 part accelerating agent. The improved method may also comprise vulcanizing the synthesized rubber compound in a mold to produce a rubber wheel having a Shore A hardness between 50 and 60.

22 Claims, 1 Drawing Sheet

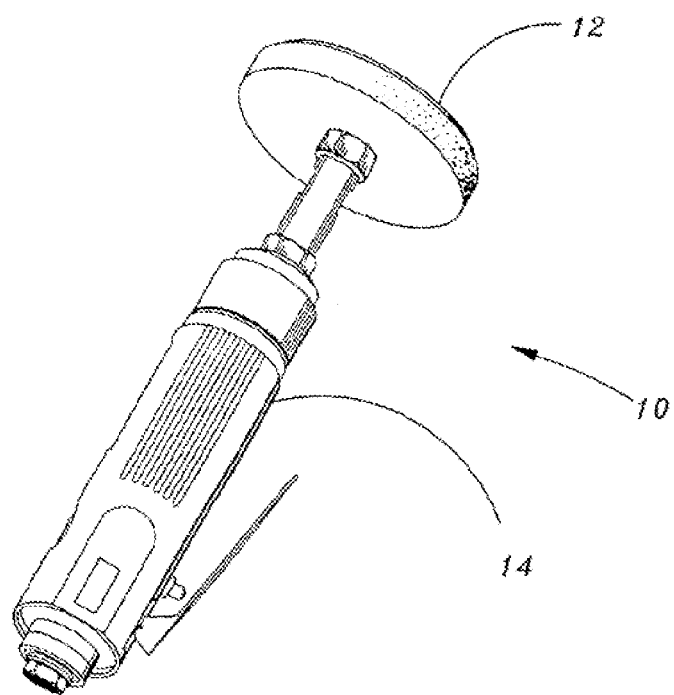
FIG.1
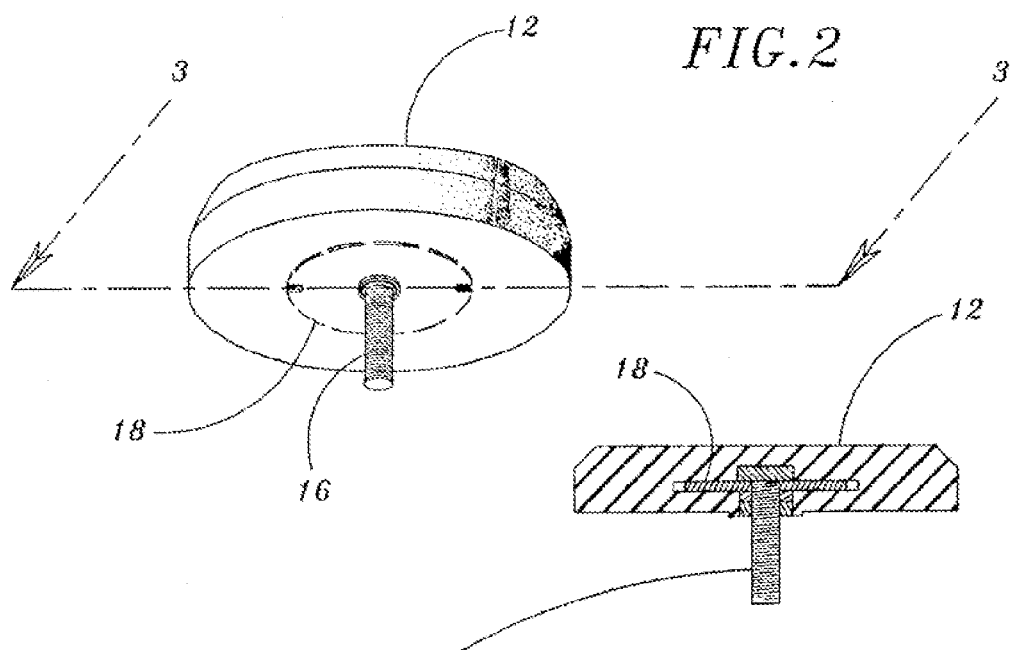
FIG.2
FIG.3
(Section on line 3 – 3)

METHOD OF MANUFACTURING AND COMPOSITION OF RUBBER WHEELS TO REMOVE ADHESIVE

FIELD OF THE INVENTION

The present invention relates to the field of manufacturing rubber products. More specifically, the present invention relates to the field of manufacturing rubber wheels used for removing vehicle adhesives.

BACKGROUND OF THE INVENTION

In automobile and other vehicle manufacture and service industries, people often need to remove pinstripes, decals, side moldings and other adhered items from the bodies of vehicles such as trucks or automobiles. Traditionally, this is done by peeling, scratching or sanding off the pinstripes, decals, side moldings, etc. However, these traditional methods usually cause damage to the original paint of the bodies of the vehicles.

It is known that most of the pinstripes, decals and side moldings and many other functional or decorative items are adhered on the body of a vehicle. It is also known that at a certain temperature, the adhesive retaining the item on the vehicle will lose its adhesion. It is further known that rotating a rubber wheel at a desired speed and frictionally engaging the rubber wheel with the pinstripe, decal, side molding or other adhered item on the body of a vehicle, such as truck or automobile, may generate the frictional heat necessary to cause the adhered item to lose its adhesion.

One critical aspect of removing pinstripes, decals, side moldings and other adhered items from a vehicle is the hardness of the rubber wheel of the portable vehicle adhesive remover. On one hand, if the rubber wheel is too soft, it may not generate adequate heat, or take too long to generate adequate heat, as it is applied to pinstripes, decals, side moldings and other adhered items to cause the adhesive to lose adhesion with the body of the vehicle. On the other hand, if the rubber wheel is too hard, it may leave permanent damage on the original paint of the vehicle.

Another critical aspect of removing pinstripes, decals, side moldings and other adhered items from a vehicle is the friability of the rubber wheel. The rubber wheel needs to be strong and hold together to generate adequate heat as described above, but also gradually break off into pieces before it heats up leaving permanent damage on the original paint of the vehicle.

An exemplary rubber wheel adhesive remover is disclosed in U.S. Pat. No. 5,624,990 (the '990 patent) issued to Vipperman on Apr. 29, 1997. The '990 patent describes a method of manufacturing a rubber wheel for removing pinstripes, decals, side moldings and other adhered items from a vehicle. The '990 patent describes a rubber wheel with a hardness between 40 and 45, preferably 42. A rubber wheel having hardness between 40 and 45 may be too soft to effectively generate adequate heat to cause the adhesive to lose adhesion so pinstripes, decals, side moldings and other adhered items may be removed. A rubber wheel having hardness between 40 and 45 must be rotated at higher speeds in order for it to generate substantial heat. The '990 patent also discloses a rubber wheel that is formed by a method that includes adding a substantial amount of hard clays as inorganic filler into the masticated rubber mixture. Using hard clay as an inorganic filler results in a rubber wheel that is less friable, causing the rubber wheel to heat up and burn rubber across the paint finish of a vehicle before it crumbles and breaks off.

It is desirable to manufacture rubber wheels for use on a portable vehicle adhesive remover for removing pinstripes, decals, side moldings and other adhered items from a vehicle that optimizes the two critical features described above. The disclosed method of manufacturing a rubber wheel and composition thereof is directed at overcoming one or more of the problems identified in the prior art.

SUMMARY OF THE INVENTION

The present invention is an improved method of manufacturing rubber wheels used on a portable vehicle adhesive remover for removing pinstripes, decals, side moldings and other adhered items from a vehicle without damaging the original paint of the vehicle, and composition of the rubber wheels.

In one aspect, the present disclosure is directed to a method of manufacturing a rubber wheel for use on a portable vehicle adhesive remover for removing pinstripes, decals, side moldings and other adhered items from a vehicle. The method of manufacturing rubber wheels may comprise masticating approximately 100 parts of rubber in a mixer at a temperature between approximately 170°-300° F. to produce a viscous rubber mixture. The method of manufacturing may further include synthesizing a rubber compound having a temperature between approximately 100°-150° F. by mixing into the rubber mixture at least 8 parts of activating agents, less than 60 parts of processing oil, at least 0.1% but not more than 1.5% by parts of cross-linking agent, and at least 1 part accelerating agent. The improved method may also comprise placing a coupling member made of metal material inside a mold and vulcanizing the synthesized rubber compound in the mold at a temperature between approximately 300°-350° F. and under a pressure between approximately 2,000-5,000 psi for a time period between approximately 10-20 minutes to produce a rubber wheel having a Shore A hardness between 50 and 60.

In another aspect, the present disclosure is directed to a rubber wheel for use on a portable vehicle adhesive remover for removing pinstripes, decals, side moldings and other adhered items from a vehicle. The rubber wheel may include approximately 100 parts of rubber, at least 8 parts activating agents, less than 60 parts of processing oil, at least 0.1% but not more than 1.5% by parts of cross-linking agent, and at least 1 part accelerating agent. The rubber wheel may have a Shore A hardness between 50 and 60. The rubber wheel may also include a coupling member made of metal material for coupling the rubber wheel to a portable vehicle adhesive remover.

BRIEF DESCRIPTION OF THE DRAWINGS

The nature and mode of the operation of the present invention will now be more fully described in the following detailed description of the invention taken with the accompanying drawing figures. The drawing figures are an exemplary construction of the invention and are for the purpose of illustrating the invention.

FIG. 1 is a perspective view of the present improved rubber wheel used on a portable vehicle adhesive remover.

FIG. 2 is a perspective view of the present improved rubber wheel having a stem attached to an embedded disc for attachment with the portable vehicle adhesive remover.

FIG. 3 is a cross-sectional view taken along line 3-3 of FIG. 2.

DESCRIPTION OF THE PREFERRED EMBODIMENT

Although specific embodiments of the present invention will now be described with reference to the drawings, it should be understood that such embodiments are by way of example only and merely illustrative of but a small number of the many possible embodiments that may represent applications of the principles of the present invention. Various changes and modifications obvious to one having ordinary skill in the art to which the present invention pertains are deemed to be within the spirit, scope and contemplation of the present invention as defined in the appended claims.

An improved method of removing pinstripes, decals, side moldings and other adhered items from a vehicle that utilizes a portable vehicle adhesive remover. Referring to FIG. 1, the portable vehicle adhesive remover 10 has a rubber wheel 12 driven by a geared air die grinder 14. It is understood by those having ordinary skill in the art that any tool geared to drive the rubber wheel 12 within the appropriate range of speeds may be used. When high pressure compressed air (not shown) is sent into the air die grinder 14, it drives the rubber wheel 12 to rotate at a high speed. An electrical die grinder (not shown) or other rotating tool may also be used. As the high speed rotating rubber wheel 12 is engaged to a pinstripe, decal, side molding or other adhered item, it may generate heat to cause the adhesive to lose its adhesion and, thus, release the pinstripe, decal, side molding or other adhered items from the vehicle. The pinstripe, decal, side molding or other adhered item can then be removed without damaging the original paint on the vehicle.

The portable vehicle adhesive remover 10 is a two-speed tool that rotates the rubber wheel 12 at first speed of approximately 2,000 rpm, and a second speed of approximately 3,800-4,000 rpm. The two speed capability allows for the lower speed (2,000 rpm) to be used for effective pinstripe removal, while the higher speed (3,800-4,000 rpm) is effective for the removal of double faced tape and decals. Using the tool at the lower speed will effectively remove pinstripes without damaging the original paint of the vehicle. Using the tool at the higher speed will effectively remove double faced tape and decals, which typically are not located on areas of original paint. If the tool is used at the higher speed on any area with original paint, however, the original paint may be damaged when applied.

Referring to FIG. 2 and FIG. 3, there is shown the present invention rubber wheel 12 having a stem 16 attached to an embedded disc 18 for attachment with the portable geared air die grinder 14. The rubber wheel 12 is made of natural or synthetic rubber, or a mixture of natural and synthetic rubbers, plus other admixtures. The relative amount of the rubber mixture and other admixtures are described in the designation of "parts" which has traditionally been used by persons having ordinary skill in the industry. For example, a mixture having a total weight of 100 lbs. that includes 60 lbs. of a first substance and 40 lbs. of a second substance is described as a mixture having 60 parts of the first substance and 40 parts of the second substance.

Initially, about 100 parts of rubber are masticated in a mixer. These 100 parts of rubber may contain only natural rubber, only synthetic rubber, or both natural and synthetic rubber. The percentage by parts of the natural rubber may, therefore, be anywhere from 0% to 100%. Accordingly, the percentage by parts of the synthetic rubber may also be anywhere from 0% to 100%. The synthetic rubber used in the present invention may be any polymer including silicone and polyurethane. Preferably, synthetic rubbers such as ethylene-propylene diene monomer (EPDM), ethylene-propylene terpolyme (EPT), or ethylene-propylene rubber (EPR or EPM) may be used. By way of example, in the preferred embodiment of the present invention, the percentage by parts of natural rubber is 0%, and the percentage by parts of synthetic rubber is 100%. The synthetic rubbers used in the preferred embodiment of the present invention are Royalene 511 EPDM and Royalene 512 EPDM. It is contemplated that other types of synthetic rubbers may be used. The percentage by parts of Royalene 511 EPDM is 50%, and the percentage by parts of Royalene 512 EPDM is 50%, which means that in 100 parts of rubber, there are 50 parts of Royalene 511 EPDM and 50 parts of Royalene 512 EPDM. It will be appreciated that other percentages may well be incorporated by the present invention. In the following discussion, unless otherwise specified, the relative amounts of other admixtures are measured by their respective parts with respect to this first 100 parts of rubber.

The rubber is masticated in the masticating mixer until it becomes a viscous rubber mixture having a desired viscosity and a temperature of about 175°-300° F. Various admixtures are then mixed into the viscous rubber mixture. Initially, a first activating agent is mixed into the viscous rubber mixture. The activating agent may be a fatty acid such as stearic acid. Mixing of the stabilizing agent is optional but preferred. For the 100 parts of rubber, about 1 part of stearic acid may be added. Then, a second, third and fourth activating agents are added. The second, third and fourth activating agents may be zinc oxide, Desical P and Carbowax (PEG) 3350, respectively. For the 100 parts of rubber, at least 8 parts but not more than 14 parts of the activating agents may be added. The preferred amount of zinc oxide is about 5 parts. The preferred amount of Desical P is about 3 parts. The preferred amount of Carbowax (PEG) 3350 is about 3 parts.

After the activating agents are mixed into the viscous rubber mixture, an appropriate amount of inorganic filler and processing oil are added. The inorganic filler is added to improve the friability of the final product rubber wheel. The amount of the inorganic filler may be at least 50 parts but not more than 150 parts. If the amount of the inorganic filler is too low, then the rubber wheel may not be friable enough—it may be too hard and the rubber wheel may heat up to above desired levels before pieces of the rubber wheel break off. Yet, if the amount of the inorganic filler is too high, then the rubber wheel may be too friable—it may not be hard enough and break off into pieces before generating the desired heat to remove the pinstripes, decals, side moldings or other adhered items from a vehicle. Various inorganic fillers may be used in the present invention to achieve the desired results including, but not limited to, talc, treated talc, clay, treated clay, silica, calcium carbonate, treated calcium carbonate, aluminum, silicate, aluminum hydroxide, diatomaceous earth, calcium silicate, kaolin, magnesium hydroxide, pumice, quartz, and wollastonite. The inorganic fillers used in the preferred embodiment of the present invention are talc and calcium carbonate ($CaCO_3$), often referred to as "whiting." In the preferred embodiment, the talc Mistron Vapor is used. The total amount of the inorganic filler is about 115 parts, wherein 50 parts are Mistron Vapor and 65 parts are calcium carbonate. A colorant, titanium dioxide ($TiO_2$), may also be added to stabilize the color of the rubber wheel. In the preferred embodiment of the present invention, 5 parts of titanium dioxide may be used. The processing oil is used for improving the workability of the rubber mixture. Various compatible processing oils or plasticizers may be used in the present invention including, but not limited to, naphthenic oil, aromatic oil, and paraffinic oil. In the preferred embodiment of the present invention, about 40 parts of the processing oil Sunpar 2280 may be added. As the above-described admixtures are mixed into the viscous rubber mixture, the temperature of the resulting rubber mixture is gradually reduced to about 100°-150° F.

Next, a cross-linking agent and accelerating agents are mixed into the cooled rubber mixture. The elasticity of the rubber wheel is inversely proportional to the amount of cross-linking agent added. As the cross-linking agent content increases, the rubber wheel hardens. Conversely, as the cross-linking agent content decreases, the rubber wheel softens. Thus, if the cross-linking agent content is too low, then the rubber wheel may not be firm enough, but if the cross-linking agent content is too high, then the final rubber wheel may not be soft enough. A common cross-linking agent is sulfur. It is contemplated that other cross-linking agents known to those having ordinary skill in the art may also be used. For the purpose of the present invention, the amount of sulfur may be within the range of about 1-5 parts, or about 0.1-1.5% by parts of the total parts of the rubber mixture. In the preferred embodiment of the present invention, about 1.8 parts of sulfur are used, which is about 0.6% parts of sulfur. The accelerating agents are used to speed up the vulcanization process and to improve the properties of the vulcanisates. About 1.25 parts of N-Cyclohexyl-2-benzothiazole sulfenamide (CBS), about 1 part of dipentamethylenethiuram-hexasulfide (DPTT), and about 0.5 parts of 2-mercaptobenzothiazole (MBT) are added as accelerating agents. It is contemplated that other accelerating agents known to those having ordinary skill in the art may also be used.

It is understood that the sequence of mixing the admixtures in the above described synthesizing process is the sequence used in one of the preferred embodiments of the present invention. Other sequences may well be followed. For example, the cross-linking agent and the accelerating agent may be added before the viscous rubber mixture is cooled down to about 100°-150° F. It is preferred, however, that the entire mixing or synthesizing process is completed within about 10 minutes. It is also understood that various other optional substances may be mixed into the viscous rubber mixture for either improving the workability of the viscous rubber mixture or improving various properties of the product rubber wheel. For example, about 2 parts of an anti-oxidant agent, such as Naguard 445, may be added for delaying the aging of the rubber wheel related to the action of oxygen. Furthermore, an appropriate amount of pumice may be mixed into the rubber mixture to improve the abrasive properties of the rubber wheel.

The resulting mixture of the above-described synthesizing process is a rubber compound having a temperature of about 100°-150° F., which is ready to be injected into a vulcanization mold for producing the final rubber wheel. The mold has a disc shaped hollow chamber. The metal disc 18, having a metal stem 16 attached thereto and extending perpendicular from the metal disc 18, is placed at the middle of the hollow chamber. Preferably, the metal disc 18 is primed with adhesive before it is placed at the middle of the hollow chamber. When the rubber wheel 12 is formed, the metal disc 18 is embedded at the middle of the rubber wheel 12, and the metal stem 16 attached to the metal disc 18 extends out of the rubber wheel 12 for connecting to the air die grinder 14. The rubber wheel 12 has a diameter of about 3 inches, and a thickness of about ½ an inch.

After the rubber compound is injected into the vulcanization mold, air is excluded from the mold and the vulcanization process is carried out under an appropriate pressure at an appropriate temperature for an appropriate time period. In the preferred embodiment of the present invention, the pressure of the mold is kept between about 2,000-5,000 psi, the temperature of the mold is kept at about 310° F., and the time period of molding is about 15 minutes.

An example of the formula used in the preferred embodiment of the present invention is shown in Table I below. Table I lists the ingredients, the corresponding commercially available products used, and amounts of the substances used by parts.

TABLE I

EXAMPLE OF INGREDIENTS

| INGREDIENTS | PRODUCTS | AMOUNTS |
|---|---|---|
| Synthetic Rubber | ROYALENE 511 | 50 |
| Synthetic Rubber | ROYALENE 512 | 50 |
| Processing Oil | SUNPAR 2280 | 40 |
| Inorganic Filler | MISTRON VAPOR | 50 |
| Inorganic Filler | WHITING | 65 |
| Colorant | TIO$_2$ | 5 |
| Activating Agent | STEARIC ACID | 1 |
| Activating Agent | ZINC OXIDE | 5 |
| Activating Agent | DESICAL P | 3 |
| Activating Agent | CARBOWAX 3350 | 3 |
| Anti-Oxidant Agent | NAGUARD 445 | 2 |
| Crosslinking Agent | SULFUR | 1.8 |
| Accelerating Agent | DPTT | 1 |
| Accelerating Agent | CBS | 1.25 |
| Accelerating Agent | MBT | 0.5 |

In an alternative embodiment, about 100 parts of rubber are masticated in a mixer. By way of example, in this embodiment of the present invention, the percentage by parts of natural rubber is 0%, and the percentage by parts of synthetic rubber is 100%. The synthetic rubber used in this embodiment of the present invention is SBR 1502. It is contemplated that other types of synthetic rubbers may be used. The percentage by parts of SBR 1502 is 100%, which means that in 100 parts of rubber, there is 100 parts of SBR 1502. It will be appreciated that other percentages may well be incorporated by the present invention. In the following discussion, unless otherwise specified, the relative amounts of other admixtures are measured by their respective parts with respect to this first 100 parts of rubber.

The rubber is masticated in the masticating mixer until it becomes a viscous rubber mixture having a desired viscosity and a temperature of about 175°-300° F. Various admixtures are then mixed into the viscous rubber mixture. Initially, a first activating agent is mixed into the viscous rubber mixture. Mixing of the stabilizing agent is optional but preferred. For the 100 parts of rubber, about 1 part of stearic acid may be added. Then, a second, third and fourth activating agents are added. The second, third and fourth activating agents may be zinc oxide, Desical P and Carbowax (PEG) 3350, respectively. For the 100 parts of rubber, at least 8 parts but not more than 14 parts of the activating agents may be added. The preferred amount of zinc oxide is about 5 parts. The preferred amount of Desical P is about 3 parts. The preferred amount of Carbowax (PEG) 3350 is about 3 parts.

After the activating agents are mixed into the viscous rubber mixture, an appropriate amount of inorganic filler and processing oil are added. The inorganic fillers used in this embodiment of the present invention are talc and calcium carbonate (CaCO$_3$). In this embodiment, the talc Mistron Vapor is used. Various inorganic fillers may be used in this embodiment to achieve the desired results as described above. The total amount of the inorganic filler is about 115 parts, wherein 50 parts are Mistron Vapor and 65 parts are calcium carbonate. In this embodiment of the present invention, 5 parts of titanium dioxide may be added as a colorant. In this embodiment of the present invention, about 40 parts of the processing oil Napthenic may be added. Various compatible processing oils or plasticizers may be used in this embodiment as described above. As the above-described admixtures are mixed into the viscous rubber mixture, the temperature of the resulting rubber mixture is gradually reduced to about 100°-150° F.

Next, a cross-linking agent and accelerating agents are mixed into the cooled rubber mixture. For the purpose of this embodiment of the present invention, about 2.5 parts of the cross-linking agent sulfur are used, which is about 0.9% parts of sulfur. It is contemplated that other cross-linking agents known to those having ordinary skill in the art may also be used. About 1.25 parts of zinc dibutyldithiocarbamate (ZDBC), about 1 part of 2-mercaptobenzothiazole disulfide (MBTS), and about 0.5 parts of Trimethyl trimellitate (TMTM) are added as accelerating agents. It is contemplated that other accelerating agents known to those having ordinary skill in the art may also be used. Lastly, about 2 parts of an anti-oxidant agent, such as Agerite Stalite S, may be added and an appropriate amount of pumice may be mixed into the rubber mixture.

Table II is an example of a formula used in an alternative embodiment of the present invention. Table II lists the ingredients, the corresponding commercially available products used, and amounts of the substances used by parts.

TABLE II

EXAMPLE OF INGREDIENTS

| INGREDIENTS | PRODUCTS | AMOUNTS |
|---|---|---|
| Synthetic Rubber | SBR 1502 | 100 |
| Processing Oil | NAPTHENIC OIL | 40 |
| Inorganic Filler | MISTRON VAPOR | 50 |
| Inorganic Filler | WHITING | 65 |
| Colorant | $TIO_2$ | 5 |
| Activating Agent | STEARIC ACID | 1 |
| Activating Agent | ZINC OXIDE | 5 |
| Activating Agent | CARBOWAX 3350 | 3 |
| Activating Agent | DESICAL P | 3 |
| Anti-Oxidant Agent | AGERITE STALITE S | 2 |
| Crosslinking Agent | SULFUR | 2.5 |
| Accelerating Agent | MBTS | 1 |
| Accelerating Agent | ZDBC | 1.25 |
| Accelerating Agent | TMTM | 0.5 |

The final composition is a rubber wheel having a Shore A Hardness between about 50-60. In the preferred embodiment of the present invention, the rubber wheel has a Shore A Hardness of about 55, which is suitable for use on a portable vehicle adhesive remover for removing pinstripes, decals, side moldings and other items that are adhered to a vehicle. The rubber wheel of the present invention is hard enough to effectively generate adequate heat when it is rotating at a speed within the above-specified range and applied to pinstripes, decals, side moldings and other adhered items of a vehicle to cause the adhesive to lose adhesion, yet friable enough to break apart without causing damage to the paint of the vehicle.

The detailed description provided herein is not intended in any way to limit the broad features or principles of the present invention. The present invention is not intended to be restricted to any specific embodiment disclosed herein, any particular form or arrangement, or any specific use. Further, although the invention has been described here with reference to particular means, materials and embodiments, the invention is not intended to be limited by the particulars disclosed therein, rather, the invention extends to all functionally equivalent structures, materials, methods and uses, such as are within the scope of the appended claims. Changes and modifications to the present invention should be readily apparent to those having ordinary skill in the art without departing from the spirit or scope of the claimed invention.

What is claimed is:

1. A method of manufacturing rubber wheels used on a portable adhesive remover, comprising:
   a. masticating approximately 100 parts of rubber in a mixer to produce a viscous rubber mixture;
   b. synthesizing a rubber compound by mixing into said rubber mixture:
      i. at least 8 parts activating agents;
      ii. less than 60 parts of processing oil;
      iii. at least 0.1% but not more than 1.5% of cross-linking agent;
      iv. at least 1 part accelerating agent; and
      v. at least 50 but not more than 150 parts of inorganic filler; and
   c. vulcanizing said rubber compound in a mold to produce a rubber wheel having a Shore A hardness between 50 and 60.

2. The method of manufacturing rubber wheels of claim 1, wherein said rubber compound is vulcanized in said mold to produce a rubber wheel having a Shore A hardness of 55.

3. The method of manufacturing rubber wheels of claim 1, wherein
   a. the viscous rubber mixture has a temperature between approximately 170°-300° F.; and
   b. the rubber compound has a temperature between approximately 100°-150° F.

4. The method of manufacturing rubber wheels of claim 1, wherein the vulcanizing of said rubber compound in said mold is at a temperature between approximately 300°-350° F. and under a pressure between approximately 2,000-5,000 psi for a time period between approximately 10-20 minutes.

5. The method of manufacturing rubber wheels of claim 1, further comprising placing a coupling member made of metal material inside the mold prior to vulcanizing said rubber compound.

6. The method of manufacturing rubber wheels of claim 1, wherein said approximately 100 parts of rubber comprises a combination of 0-100% by parts of natural rubber and 0-100% by parts of synthetic rubber so that the combination totals 100 parts.

7. The method of manufacturing rubber wheels of claim 6, wherein said approximately 100 parts of rubber comprises 50 parts a first rubber and 50 parts of a second rubber.

8. The method of manufacturing rubber wheels of claim 6, wherein said approximately 100 parts of rubber comprises 100 parts of a first rubber.

9. The method of manufacturing rubber wheels of claim 1, wherein said inorganic filler includes approximately 50 parts of talc and approximately 65 parts of calcium carbonate.

10. The method of manufacturing rubber wheels of claim 1, further comprising mixing at least 2 parts anti-oxidant agent in the rubber mixture during synthesizing.

11. The method of manufacturing rubber wheels of claim 1, wherein said rubber compound comprises between 0.6% and 0.9% of cross-linking agent.

12. The method of manufacturing rubber wheels of claim 1, wherein said activating agents comprise a combination of stearic acid, zinc oxide, calcium oxide, and polyethylene glycol.

13. The method of manufacturing rubber wheels of claim 1, wherein said accelerating agent is not more than 3 parts.

14. The method of manufacturing rubber wheels of claim 1, wherein said accelerating agent comprises at least one of N-Cyclohexyl-2-benzothiazole sulfenamide, dipentamethylenethiuram-hexasulfide, 2-mercaptobenzothiazole, zinc dibutyldithiocarbamate, 2-mercaptobenzothiazole disulfide, or Trimethyl trimellitate.

15. A rubber wheel for use on a portable adhesive remover, comprising:
    a. 100 parts of rubber;
    b. at least 8 parts activating agents;
    c. less than 60 parts of processing oil;
    d. at least 0.1% but not more than 1.5% by parts of cross-linking agent
    e. at least 1 part accelerating agent;
    f. at least 50 but not more than 150 parts of inorganic filler; and
    g. having a Shore A hardness between 50 and 60.

16. The rubber wheel of claim 15, wherein said rubber wheel has a Shore A hardness of 55.

17. The rubber wheel of claim 15, further comprising a metal coupling member.

18. The rubber wheel of claim 15, wherein the inorganic filler comprises approximately 50 parts of talc and approximately 65 parts of calcium carbonate.

19. A method of manufacturing rubber wheels used on a portable adhesive remover, comprising:
    a. masticating approximately 100 parts of rubber in a mixer at a temperature between approximately 170°-300° F. to produce a viscous rubber mixture;
    b. synthesizing a rubber compound having a temperature between approximately 100°-150° F. by mixing into said rubber mixture:
        i. at least 8 parts activating agents;
        ii. less than 60 parts of processing oil;
        iii. at least 0.1% but not more than 1.5% of cross-linking agent; and
        iv. at least 1 part accelerating agent; and
        v. at least 50 but not more than 150 parts of inorganic filler; and
    c. vulcanizing said rubber compound in a mold at a temperature between approximately 300°-350° F. and under a pressure between approximately 2,000-5,000 psi for a time period between approximately 10-20 minutes to produce a rubber wheel having a Shore A hardness between 50 and 60.

20. The method of manufacturing rubber wheels of claim 1, wherein said rubber mixture comprises at least 10 parts activating agents.

21. The rubber wheel of claim 15, wherein said rubber mixture comprises at least 10 parts activating agents.

22. A method of manufacturing rubber wheels used on a portable adhesive remover of claim 19, wherein said rubber mixture comprises at least 10 parts activating agents.

\* \* \* \* \*